United States Patent
Umeo et al.

(10) Patent No.: US 7,433,846 B2
(45) Date of Patent: Oct. 7, 2008

(54) METHOD OF EMBEDDING PERMANENT IDENTIFICATION CODE INTO MUSICAL APPARATUS

(75) Inventors: Tatsuya Umeo, Hamamatsu (JP); Masaaki Okabayashi, Hamakita (JP)

(73) Assignee: Yamaha Corporation, Hamamatsu-Shi (JP)

(*) Notice: Subject to any disclaimer, the term of this patent is extended or adjusted under 35 U.S.C. 154(b) by 17 days.

(21) Appl. No.: 10/903,725

(22) Filed: Jul. 30, 2004

(65) Prior Publication Data
US 2005/0033699 A1 Feb. 10, 2005

(30) Foreign Application Priority Data
Aug. 6, 2003 (JP) .............................. 2003-287366
Aug. 6, 2003 (JP) .............................. 2003-287367

(51) Int. Cl.
H04K 1/00 (2006.01)
H04L 9/00 (2006.01)

(52) U.S. Cl. .............................. 705/52; 705/56; 705/59

(58) Field of Classification Search .................. 705/59, 705/52, 56
See application file for complete search history.

(56) References Cited

U.S. PATENT DOCUMENTS 6,594,646 B1 * 7/2003 Okayama et al. ............... 705/51
2002/0002541 A1 * 1/2002 Williams ....................... 705/51
2002/0116622 A1 * 8/2002 Okaue et al. .................. 713/189
2003/0014630 A1 * 1/2003 Spencer et al. ................ 713/168
2003/0084306 A1 * 5/2003 Abburi et al. ................. 713/188
2003/0177073 A1 * 9/2003 Ogai ............................ 705/26
2004/0042363 A1   3/2004 Kobayashi et al.

FOREIGN PATENT DOCUMENTS

| EP | 1 349 058 A1 | 10/2003 |
| JP | 2002-152188 | 5/2002 |
| JP | 2002-183075 | 6/2002 |
| JP | 2002-196891 | 7/2002 |
| JP | 2003-044689 | 2/2003 |
| JP | 2003-271137 | 9/2003 |

OTHER PUBLICATIONS

Full English Translation of JP-2003-44689, published Feb. 14, 2003.

* cited by examiner

*Primary Examiner*—Andrew J. Fischer
*Assistant Examiner*—Nancy T. Le
(74) *Attorney, Agent, or Firm*—Morrison & Foerster LLP

(57) ABSTRACT

A method is designed for embedding an identification code into a musical apparatus which is allotted a serial number. The method is carried out by the steps of accepting an input of the serial number by a user of the musical apparatus, applying a specific operation to the accepted serial number to generate the identification code which is associated with the serial number and which is capable of uniquely identifying the music apparatus, and writing the generated identification code into a specified address of a nonvolatile memory which is integrated in the music apparatus such that the written identification code is never rewritten inappropriately.

6 Claims, 11 Drawing Sheets

FIG. 3(a)

MANAGEMENT DATA

| | |
|---|---|
| MODEL CODE | ~301 |
| APPARATUS SERIAL NUMBER | ~302 |
| APPARATUS ID | ~303 |
| DATA TYPE | ~304 |
| DATA SERIAL | ~305 |
| ACCESS KEY | ~306 |
| MISCELLANEOUS DATA | ~307 |
| DATA TYPE | |
| DATA SERIAL | |
| ACCESS KEY | |
| MISCELLANEOUS DATA | |
| ⋮ | |

322 ~ { rows 304–307 }
323 ~ { next DATA TYPE / DATA SERIAL / ACCESS KEY / MISCELLANEOUS DATA block }

FIG. 3(b)

EFFECT DATA

| # | |
|---|---|
| 1 | BASIC EFFECT 1 |
| 2 | BASIC EFFECT 2 |
| 3 | BASIC EFFECT 3 |
| | ⋮ |
| 32 | ADDITIONAL EFFECT A1 |
| 33 | ADDITIONAL EFFECT A2 |
| | ⋮ |
| 38 | ADDITIONAL EFFECT B1 |
| 39 | ADDITIONAL EFFECT B2 |
| | ⋮ |
| | USER U1 |
| | USER U2 |
| | ⋮ |
| | ALGORITHM 1 |
| | ALGORITHM 2 |
| | ALGORITHM 3 |
| | ⋮ |

311: BASIC EFFECTS
312: ADDITIONAL EFFECT A
313: ADDITIONAL EFFECT B
314: USER
315: ALGORITHM

```
FIRMWARE VERSION:V02
APPARATUS ID:XXXXXXXX
```

```
FIRMWARE VERSION:V02
ENTER THE APPARATUS SERIAL
NUMBER INDICATED ON THE
NAMEPLATE OF THE APPARATUS.
[SERIAL NUMBER INPUT BUTTON]
[CANCEL(TO INPUT LATER)]
```

```
ENTER THE SERIAL NUMBER.
APPARATUS SERIAL NUMBER [    ]
   [OK]         [CANCEL]
```

FIG. 6(a)

MASTERING FX
SIGN-UP PROGRAM

MODEL: DM2000
APPARATUS SERIAL NUMBER: CX45038DEV
APPARATUS ID: X56MA0039SV
SERIAL NUMBER: SH508003W
MAIL ADDRESS: umeo@nakazawa.net

[SEND] [CANCEL]

FIG. 6(b)

MASTERING FX
KEY INPUT

MODEL: DM2000
APPARATUS SERIAL NUMBER: CX45038DEV
APPARATUS ID: X56MA0039SV
SERIAL NUMBER: SH508003W
KEY INPUT:

[OK] [CANCEL]

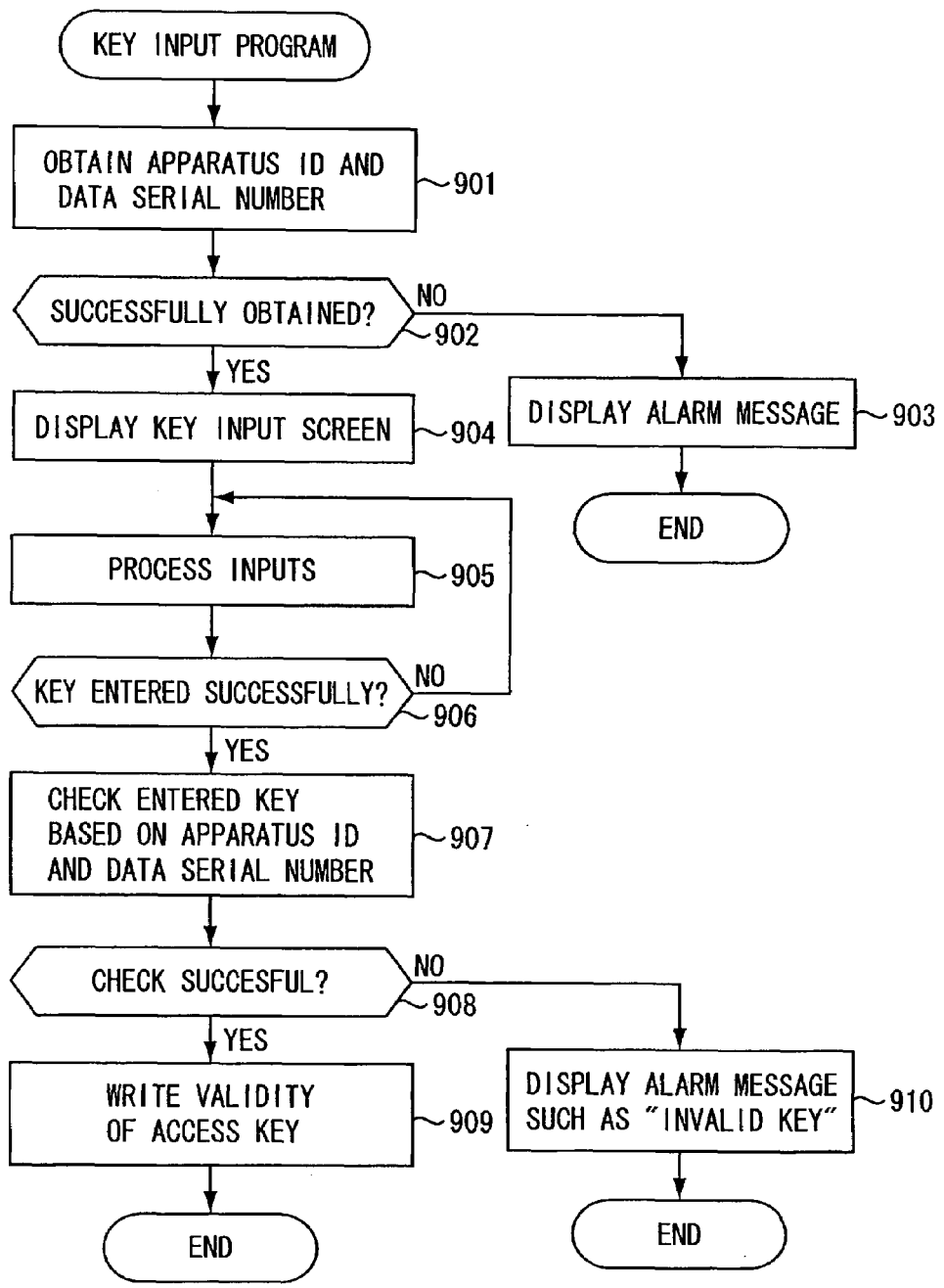

FIG. 10

| NORMAL SERIAL | INPUT SERIAL | APPARATUS ID | E-MAIL AD | EFA INFORAMATION | EFB INFORAMATION |
|---|---|---|---|---|---|
| | | | | | |
| | | | | | |
| | | | | | |
| | | | | | |
| | | | | | |
| | | | | | |

1001 — NORMAL SERIAL
1002 — INPUT SERIAL
1003 — APPARATUS ID
1004 — E-MAIL AD
1005 — EFA INFORAMATION
1006 — EFB INFORAMATION

METHOD OF EMBEDDING PERMANENT IDENTIFICATION CODE INTO MUSICAL APPARATUS

BACKGROUND OF THE INVENTION

The present invention relates to a method of providing a musical apparatus with an apparatus ID for specifying the apparatus.

The present invention also relates to a license management method of music data provided for a musical apparatus.

Various musical apparatuses such as digital mixers and synthesizers have a plurality of functions. Basically, a user can use all the functions provided. These musical apparatus functions must be appropriately protected and managed from the viewpoint of copyright protection, license management, and security stabilization.

For such protection and management, each musical apparatus needs to keep an unrewritable apparatus ID. Such ID is used for identify individual musical apparatuses one by one and inspects and manages concerning: which function is licensed for which apparatus; whether or not musical data to be used is permitted for the apparatus; or whether or not musical data is to be used for an unauthorized apparatus. Musical apparatuses are allocated with apparatus IDs in several ways. For example, before shipment, the manufacturer just memorizes an apparatus ID for specifying each musical apparatus in a storage device of each musical apparatus. However, there may be a case where an apparatus ID needs to be allotted to the musical apparatus located at a user's site. When there are available musical apparatuses of different versions of firmware, for example, those installed with an earlier version of firmware might be shipped without the apparatus ID. In such a case, when the firmware is upgraded at the user site, an apparatus ID might be provided.

For this purpose, the inventors propose a technique to automatically provide an apparatus ID to musical apparatuses that are already shipped or are scheduled to be shipped (Jpn. Pat. Appln. No. 2002-074928, undisclosed at the time of the present application). The undisclosed application describes several methods. For example, one method allows a user to enter an apparatus's serial number and uses this serial number as the apparatus ID. Another method uses the ID supplied to the CPU as the apparatus ID. Still another method generates a random number at an initial power-on time and stores this random number as the apparatus ID.

However, a user may enter an incorrect serial number in the method of allowing the user to enter the apparatus's serial number. If an incorrect serial number is used for the user registration, a complicated procedure is needed to confirm an authorized user who wants the registration later. Further, the user may enter the same number for a plurality of apparatuses to assign the same apparatus ID to different apparatuses.

In the method of using the CPU's ID or a random number as the apparatus ID, such an apparatus is not related to the apparatus concerned and is inappropriate as an ID for identifying the apparatus. Normally, each apparatus has a unique serial number. The serial number may be engraved at the rear of the body or may be printed on an nameplate attached to the rear thereof. The apparatus's manufacturer manages users in association with the apparatus serial numbers. Accordingly, it is desired that an apparatus ID be associated with the apparatus serial number.

A musical apparatus uses internal nonvolatile memory to store various types of music data such as timbre data, sound source algorithm, effect data (only parameters), effect data (algorithm and parameters), song data, rhythm data, and accompaniment data. When purchasing a musical apparatus, a user can use all of these music data installed in the musical apparatus. On the other hand, these music data need to be protected and managed as needed from the viewpoint of copyright protection and license management. In particular, a considerable amount of time is spent to create music data in many cases, making the above-mentioned protection and management important.

The price of a musical apparatus includes costs of creating the above-mentioned music data, royalties of the copyright paid to musicians, and the like. Installing many pieces of music data increases the price of the musical apparatus. On the other hand, various demands are made from users who purchase the musical apparatus. Some users want a lot of song data and others attach greater value to effect data. Accordingly, it is preferable bunde minimum music data at the purchase of the musical apparatus and later add various music data at a user's request. In this case, a user may purchase new music data and personally install it in the musical apparatus. Users may think such work bothering or may make a mistake in the installation.

In consideration for the above-mentioned situations, it is desirable to supply the musical apparatus as follows. Before shipment of the musical apparatus, the internal memory stores as much data as possible. When purchasing the musical apparatus, users are allowed to use only part of the prestored music data. The remaining music data is protected against the use by means of a copyright management feature. Since some music data is protected against the use, the musical apparatus can be supplied at a low price. Preferably, users can unprotect the protected music data by paying a proper fee.

SUMMARY OF THE INVENTION

It is therefore a first object of the present invention to provide a method of later generating and storing an apparatus ID associated with an apparatus serial number for a musical apparatus which previously stores no apparatus ID.

It is therefore a second object of the present invention to provide a license management technology of music data so as to limit the use of part of music data pre-installed in a musical apparatus and allow a user who paid a specified fee to enable a procedure to remove the limitation without causing much operational inconvenience.

To achieve the first object, an inventive method is designed for embedding an identification code into a musical apparatus which is allotted a serial number. The inventive method comprises the steps of accepting an input of the serial number by a user of the musical apparatus, applying a specific operation to the accepted serial number to generate the identification code which is associated with the serial number and which is capable of uniquely identifying the music apparatus, and writing the generated identification code into a specified address of a nonvolatile memory which is integrated in the music apparatus such that the written identification code is never rewritten inappropriately.

Particularly, the inventive method is designed for embedding an identification code into a musical apparatus which is allotted a serial number, at the time of conducting a version-up of a firmware of the musical apparatus by a user. The inventive method comprises the steps of checking whether or not an identification code is stored at a specified address of a nonvolatile memory which is integrated in the musical apparatus, displaying a message prompting the user to input the serial number when the identification code is not stored in the specified address of the nonvolatile memory, accepting the input of the serial number from the user, applying a specific operation to the accepted serial number to generate an identification code which is associated with the serial number and which is capable of uniquely identifying the music apparatus, and writing the generated identification code into the specified address of the nonvolatile memory such that the written identification code is never rewritten inappropriately.

Preferably, the step of applying a specific operation uses unique information which is associated to the music apparatus in addition to the serial number so as to generate the identification code such that the generated identification code must be different from another identification code of another music apparatus even if the same serial number is inadvertently used in either of the music apparatus or said another music apparatus.

Preferably, the inventive method further comprises the steps of checking whether or not the same serial number is already registered when the user accesses to a management site of the music apparatus for registering the serial number and the identification code to a database of the management site, registering the serial number along with the identification code to the database when the same serial number has not been registered in the database, and performing an exceptional process when the same serial number is already registered to the database.

To achieve the second object, an inventive method is designed for managing a license of music data which is previously stored in a musical apparatus and which can be used by the music apparatus. The inventive method comprises the steps of limiting use of the stored music data when the musical apparatus does not possess an access key corresponding to the music data in a specified area of a nonvolatile memory, transmitting a serial number of the music data along with identification information of the musical apparatus to a management site of the music data via a network, the serial number being obtained by acquiring a license of the music data, checking a database of the management site to confirm a validity of the transmitted serial number and the identification information, thereby issuing an access key corresponding to the serial number and the identification information, and memorizing the serial number and the issued access key in the specified area of the nonvolatile memory so that the musical apparatus is allowed to use the stored music data.

Preferably, the managing site generates the access key by performing a specific operation using the transmitted serial number and the identification information. The musical apparatus retrieves the identification information which is previously stored in the music apparatus, performs the specific operation using the retrieved identification information and the serial number stored in the specified area of the nonvolatile memory to generate an access key, and permits the use of the stored music data only when the generated access key matches the issued access key stored in the specified area of the nonvolatile memory.

Preferably, the stored music data is collection of various items of effect data which can be used by the music apparatus to impart various effects to music sounds, and each item of the effect data can be made useable by obtaining the access key corresponding to each item.

Preferably, the stored music data includes at least one of timbre data, sound source algorithm, song data, rhythm data, and accompaniment data, and wherein each of these data can be made useable by obtaining the access key corresponding to each of these data.

According to the first aspect of the present invention, even if a user inadvertently enters an incorrect apparatus serial number for user registration, an apparatus ID can be generated from the entered apparatus serial number. The apparatus ID can be used as it is to identify each user. This eliminates the need for a complicated procedure to rewrite the apparatus serial number and the apparatus ID stored in the user's apparatus even if the entered apparatus serial number is incorrect. The apparatus can be continuously used with the incorrectly entered apparatus serial number. Even if the same apparatus serial number is stored for a plurality of musical apparatuses, their operations are not affected. If a user intentionally enters the same apparatus serial number for a plurality of apparatuses, a management site can detect that the same apparatus serial number is registered. The management site can issue an inquiry to the user to confirm the correct apparatus serial number.

According to the second aspect of the present invention, music data is prestored in the musical apparatus in a nonvolatile manner. Some of the music data are initially made available to users and the others can be protected against the use by the copyright management feature. Even if the full music data is recorded inside, the musical apparatus can be supplied at a price reduced by copyright royalties of the protected music data. The protected music data can be later unprotected when a user pays a proper fee. Accordingly, the music data can be sold partially. An operation to remove the protection is easy for users.

BRIEF DESCRIPTION OF THE DRAWINGS

FIGS. 3(a) and 3(b) show a data structure in the flash memory.

FIGS. 6(a) and 6(b) show screens for registering an additional effect.

FIG. 9 is shows a flowchart of a process performed when an access key is entered to the mixer.

FIG. 10 shows a structure of the management database.

DETAILED DESCRIPTION OF THE INVENTION

Embodiments of the present invention will be described in further detail with reference to the accompanying drawings.

Figure 1:
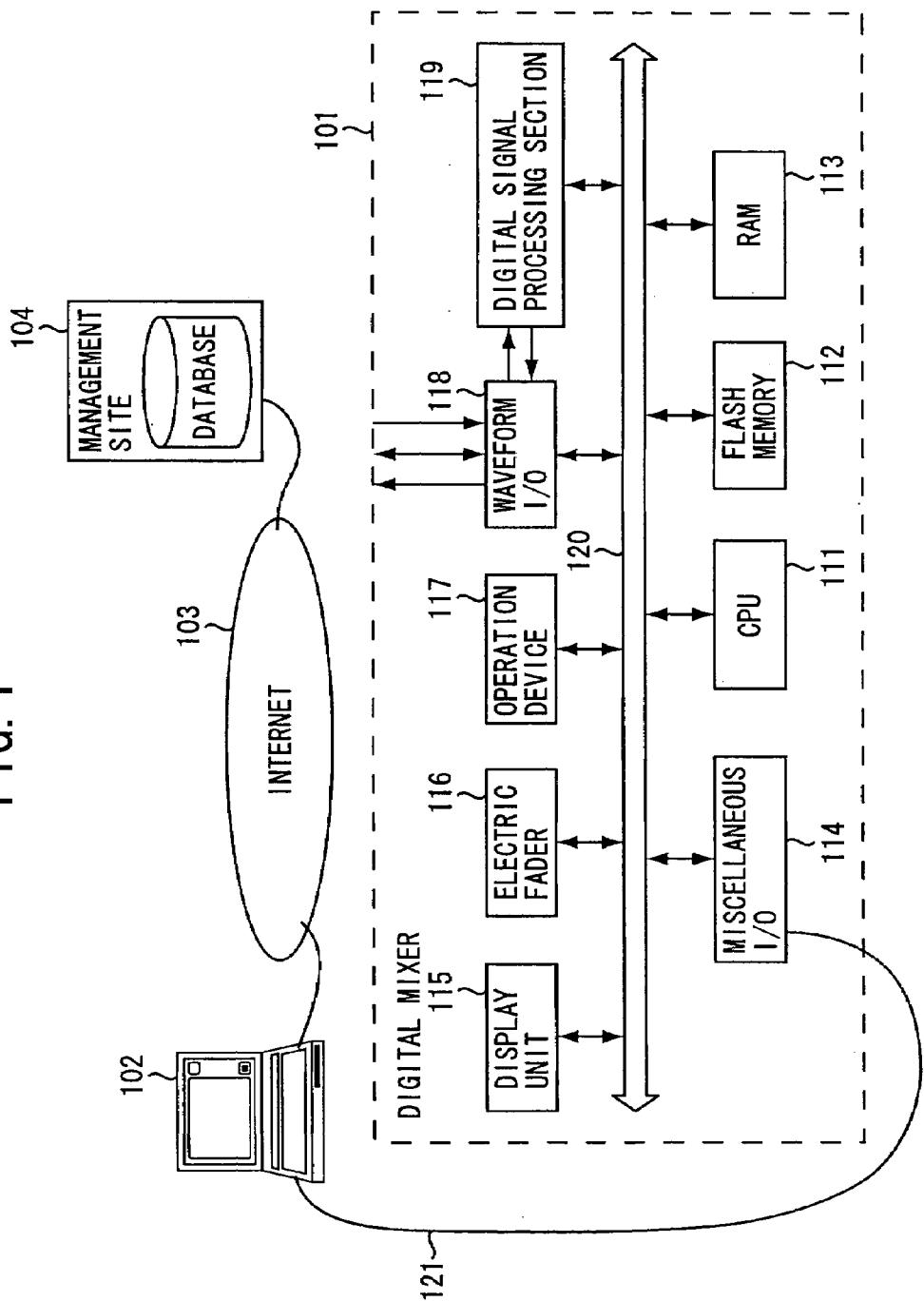
FIG. 1 shows a configuration of an overall system according to the present invention.

FIG. 1 shows a configuration of an overall system according to the present invention. A digital mixer 101 is supplied with various musical sounds, mixes them, and, if needed, provides them with various effects for output. A personal computer (PC) 102 is a general-purpose computer that is connected to the digital mixer 101 via a communication path 121. When a specified program is installed and executed, the PC 102 can provide various functions for music creation such as a hard disk recording function, a mixing function, a control function for MIDI devices, and a sequencer function for automatic performance and accompaniment. Here, it is assumed that the PC 102 is already installed with a program to control the digital mixer 101. The PC 102 has a function to connect to the Internet 103 and can further connect to a specified management site 104 via the Internet 103.

The digital mixer 101 comprises a central processing unit (CPU) 111, flash memory 112, RAM (random access memory) 113, a miscellaneous input/output interface (I/O) 114, a display unit 115, an electric fader 116, an operation device 117, a waveform I/O 118, a digital signal processing section (DSP) 119, and a system bus 120.

The CPU 111 is a processor to control overall operations of the mixer. The flash memory 112 is nonvolatile memory that stores various programs executed by the CPU 11 and various data used by the CPU 111. The flash memory 112 is only permitted to be accessed with an appropriate procedure via an appropriate program so as to prevent a user from illegally reading or writing data. The RAM 113 is volatile memory used as a load area or a work area for programs executed by the CPU 111. The miscellaneous I/O 114 is an interface for connection with various external devices and especially includes interfaces such as serial I/O, USB, and IEEE1394 for connection with the PC 102. The display unit 115 is provided on an external panel of the mixer 101 and displays various information. The electric fader 116 is an operation device that is provided on the external panel and is used for setting various parameter values such as input or output level values. Various operation devices 117 are provided on the external panel and are manipulated by users. The waveform I/O 118 is an interface to exchange musical sound waveform signals with external devices. The DSP 119 operates on parameters supplied from the CPU 111. The DSP 119 is supplied with a musical sound waveform signal via the waveform I/O 118, mixes the signal, provides it with an effect, and controls its volume level. The DSP 119 outputs the processed musical sound waveform signal via the waveform I/O 118.

Figure 2:
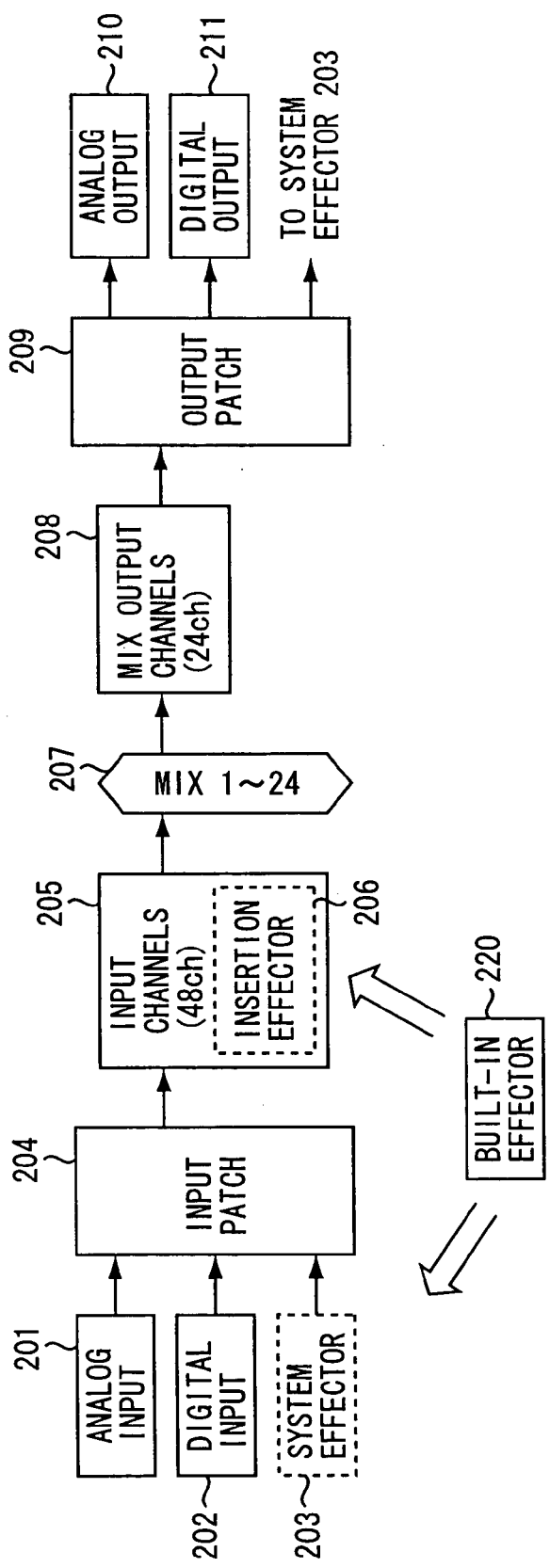
FIG. 2 is a block diagram showing a flow of signals in the mixer according to the embodiment.

FIG. 2 is a block diagram showing a flow of signals in the mixer 101 according to the embodiment. An A input 201 denotes analog input such as a microphone signal or a line signal. The analog input 201 is converted into a digital signal and is input to an input patch 204. A D input 202 denotes digital signal input. A system EF (effect) 203 is supplied with any output signal from a succeeding output patch 209, provides an effect to the signal, and supplies it to the input patch 204. The input patch 204 provides optional line connection from these input systems to input channels (48 channels) 205. A user can optionally select the line connection with reference to contents of a specified screen. Any channel signal from the input channels 205 can be selectively output to 24 MIX buses 207. An insertion EF 206 is an effect that can be inserted in the middle of the input channel. The input channel itself contains process functions such as a compressor and equalizer. An effect process by means of the insertion EF 206 can be inserted between these functions or between the equalizer and a succeeding electric fader.

The MIX buses 207 mix signals supplied from the input channel 205. A signal level from each input channel can be adjusted by using, e.g., the electric fader 116 assigned to each channel. A mixed signal is output to a corresponding MIX output channel 208. Output from the MIX output channel 208 is output to an output patch 209. The output patch 209 provides line connection from each output channel as input to any of output systems (A output, D output, system EF). An A output 210 is analog signal output, i.e., an analog signal converted from a digital signal output from the output patch 209. A D output 211 is digital signal output.

The DSP 110 mainly processes signals for the digital mixer. A system EF 203 and the insertion EF 206 are prestored in a built-in EF 220 in the flash memory 112. A user can optionally select and allocate these effects. Effect data selected from the built-in EF 220 is sent to the DSP 119. The DSP 119 operates based on the effect data to realize the system EF 203 or the insertion EF 206. The DSP 119 is provided with a limited number of resources. There is predetermined the total number of effects available as the system EF 203 and the insertion EF 206. The built-in EF 220 is allocated to the system EF 203 and the insertion EF 206 within the range of the total number of effects. The built-in EF 220 is available as not only basic effects prestored before shipment from the factory, but also an additional effect. A user can purchase additional effects and make them usable later.

FIG. 3(a) shows a structure of management data stored at specified addresses in the flash memory 112. A model code 301 specifies a model of the apparatus (mixer). An apparatus serial number 302 corresponds to an equivalent described on a nameplate attached to the mixer body. The apparatus serial number may include symbols. An apparatus ID 303 specifies the apparatus. Unlike the serial number 302, the apparatus ID 303 cannot be analogized easily. The apparatus serial number 302 is associated with the apparatus ID 303. These types of information can be used for license management and security stabilization. When a user is registered or a new license is added, it is possible to confirm consistency between the apparatus serial number 302 and the apparatus ID 303. This makes it possible to determine whether or not these data are correct.

If needed, a specified storage area in the flash memory 112 stores the model code 301, the serial number 302, and the apparatus ID 303 associated with the serial number 302 before shipment from the manufacturer. However, a user may want to store these pieces of information in an apparatus that was shipped without storing such information. The mixer according to the embodiment has a feature to enable the following. When turned on, the mixer checks whether or not the apparatus ID is stored. If needed, the mixer generates and stores an apparatus ID associated with the apparatus serial number. Therefore, after the apparatus is shipped without storing the apparatus serial number 302 and the apparatus ID 303, a user who purchased the apparatus can manually enter or generate and store such information. There is provided an advantage of omitting a process of writing the apparatus serial number 302 or the apparatus ID 303 before shipment from the manufacturer.

The above-mentioned feature can be placed in the firmware for upgrading an apparatus that was shipped without storing the above-mentioned information because of an initial version of the apparatus. After the apparatus is upgraded using the firmware, and then is turned on for the first time, for example, the information can be supplied or generated and stored. In this manner, an earlier version of apparatus having no apparatus ID can be supplied with an apparatus ID associated with the apparatus serial number like the latest version of apparatus. Accordingly, providing the apparatus ID makes available a function whose usage requires the apparatus ID. For example, such function is added to a new version and its installation or usage verifies the apparatus ID.

An upgrade program is supplied as software for the PC 102. As shown in FIG. 1, the PC 102 is connected to the mixer 101 via the communication path 121 such as USB. The upgrade program is executed on the PC 102 to upgrade the firmware stored in the flash memory 112 in the mixer 101. Before the upgrade, the flash memory 112 may store a version of firmware that does not store an apparatus ID. That is to say, in such case, the management data storage area according to the format in FIG. 3(a) is not allocated to specified addresses in the flash memory 112. A solution is to write initial values for the management data in FIG. 3(a) to specified addresses in the flash memory 112. Except the model code 301 and the data type 304, the other columns are filled with initial values such as NULL. On the other hand, before the upgrade, the flash memory 112 may store a version of firmware that stores an apparatus ID. That is to say, in such case, the management data storage area according to the format in FIG. 3(a) is allocated to specified addresses in the flash memory 112. The management data area is not rewritten because it may or may not already store a meaningful apparatus ID corresponding to the specified address.

In FIG. 3(a), a data type 304, a data serial 305, an access key 306, and miscellaneous data 307 constitute set data corresponding to one package of additional effects to be described. Set data 322 corresponds to a package 312 of additional effects. Set data 323 corresponds to a package 313 of additional effects. The data type 304 indicates a package type of additional effects. The data serial 305 is a data serial number supplied to a user when he or she purchases the license of the package. For example, the serial number is described on a specified certificate. The data serial 305 is sent to the management site 104 via the Internet. The management site 104 checks the data serial 305 and sends the access key 306. The access key 306 is key data associated with the data serial 305. The miscellaneous data 307 contains, e.g., information indicating whether or not the access key 306 is valid.

FIG. 3(b) shows a configuration of effect data stored in the flash memory 112. The reference numeral 311 represents a plurality of basic effects available from the time when the mixer is purchased. The reference numerals 312 and 313 represent packages of additional effects the user can optionally purchase later. One package is configured to contain six additional effects. For example, the package 312 contains additional effects A1 through A6. The reference numeral 314 represents an area to store user-edited effect data. The user can call an available basic effect or additional effect, and freely edit and write it to a specified location of the user area 314 for later use. Several algorithms 315 are appropriately combined to use basic effects, additional effects, and user-edited effect data comprising edited versions of the basic effects and the additional effects. The algorithms are also stored as effect data. Each one of the basic effects, the additional effects, and the user-created effects is available as the built-in EF 220 as shown in FIG. 2. As will be discussed below, an additional effect is available only when an effective access key is stored.

All the basic effect 311, the additional effects 312, 313, and so on, and the algorithm 315 are written to the flash memory 112 as shown in FIG. 3(b) before shipment of the apparatus or at an initial state after upgrading to the latest firmware. The user area 314 is unused. Initially, nothing is written to the data serial 305, the access key 306, and the miscellaneous data 307 for the set data 322, 323, and so on corresponding to the packages 312, 313, and so on of additional effects. However, data is initially written to the data type 304. This signifies that no permission is given to use the packages of additional effects corresponding to the set data 322, 323, and so on. Therefore, the additional effects 312, 313, and so on cannot be used at the initial state.

To use the package 312 of additional effects, for example, the user purchases the license of the package. By purchasing the license, the user can obtain a data serial number (data serial) for the package of additional effects. To do this, for example, it may be preferable to be able to obtain a printed certificate by purchasing the package. The data serial may be described on the certificate. The user sends the data serial to the management site 104 according to a specified procedure (to be described) to acquire an access key. Data of the additional effect 312 becomes available by writing the obtained data serial and the access key to the positions 305 and 306 in the corresponding set data 322 and writing access key validation to the miscellaneous data 307.

This feature can permit an addition function without necessitating the user to do a complicated installation procedure, especially to write an additional effect itself to the flash memory.

Figures 4, 5A, 5B, 5C:
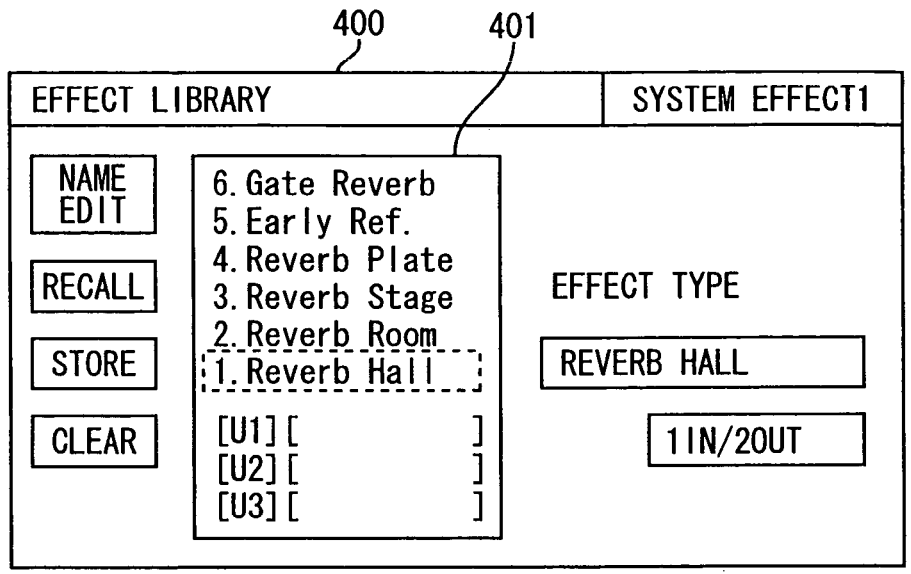
FIG. 4 shows an effect selection screen.
FIGS. 5(a), 5(b) and 5(c) show display screens for a check process during power-on sequence.

FIG. 4 shows an effect selection screen. A screen 400 displays "SYSTEM EFFECT1" on its upper right. This signifies that the screen is used to select the system EF 203 in FIG. 2. The reference numeral 401 denotes a list of selectable built-in EF 220, i.e., the basic effect 311, the additional effects 312, 313, and so on, and the user-created effect as described with reference to FIG. 3(b). The screen shows only additional effects that become available by obtaining the access key. The user can select any of effects displayed in the list 401 and use it as the system EF 203 in FIG. 2. The same applies to the insertion EF 206.

FIG. 5 shows display screens for a check process during power-on sequence and the like. FIG. 6 shows screens for registering an additional effect. These screens will be described in more detail along with the description of processes with reference to flowcharts to be described.

Figure 7A:
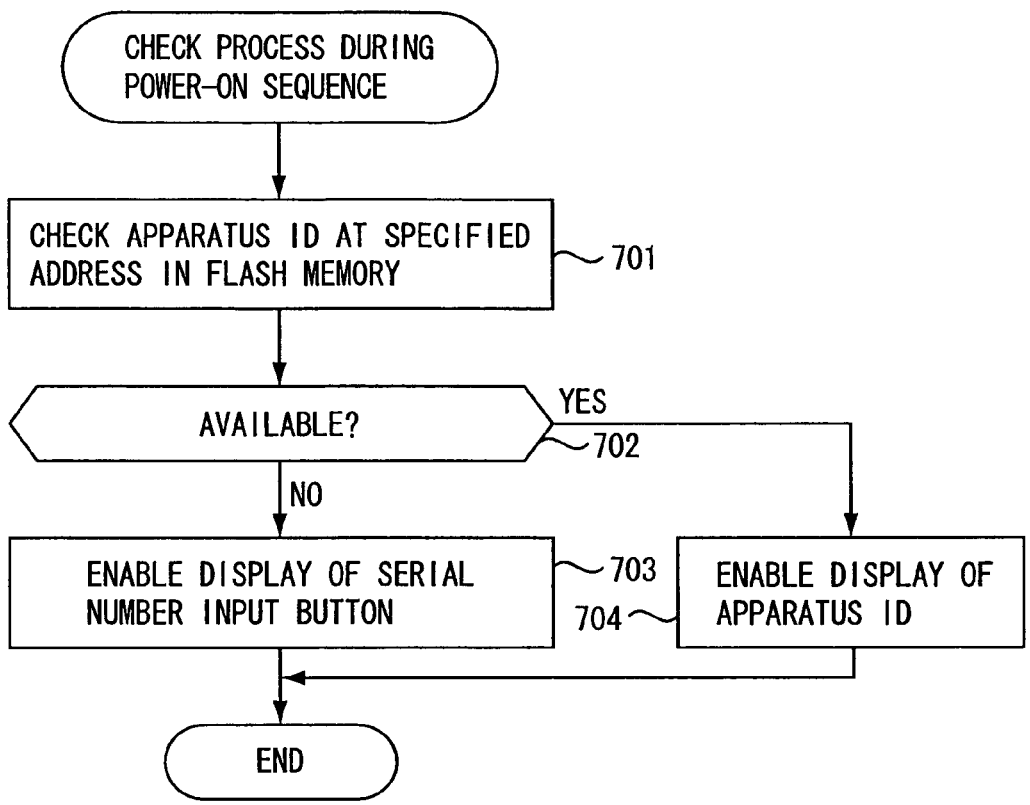
FIGS. 7(a) and 7(b) show flowcharts of a check process when turning on the mixer and a process when selecting the serial number input button.

FIG. 7(a) shows a check process when the mixer 101 is turned on. At step 701, the process checks an apparatus ID at the specified address (303 in FIG. 3(a)) in the flash memory 112. If the apparatus ID 303 is available, the process proceeds to step 704 to enable the apparatus ID to be displayed. FIG. 5(a) shows a screen displayed at step 704 on the display unit 115 of the mixer 101. Since the mixer 101 stores an apparatus ID that identifies the apparatus, the screen displays the apparatus ID as well as a general version of the mixer's firmware.

If the apparatus ID 303 is unavailable (empty) at step 702, the process enables display of a serial number input button at step 703. FIG. 5(b) shows a screen displayed at step 703 on the display unit 115 of the mixer 101. The screen shows the serial number input button as well as a message prompting the user to enter an apparatus serial number. Selecting the serial number input button on this screen starts the process in FIG. 7(b). Selecting a cancel button makes the apparatus usable without the apparatus ID. In this case, the screen in FIG. 5(b) is redisplayed at the next power-on sequence.

Figure 7B:
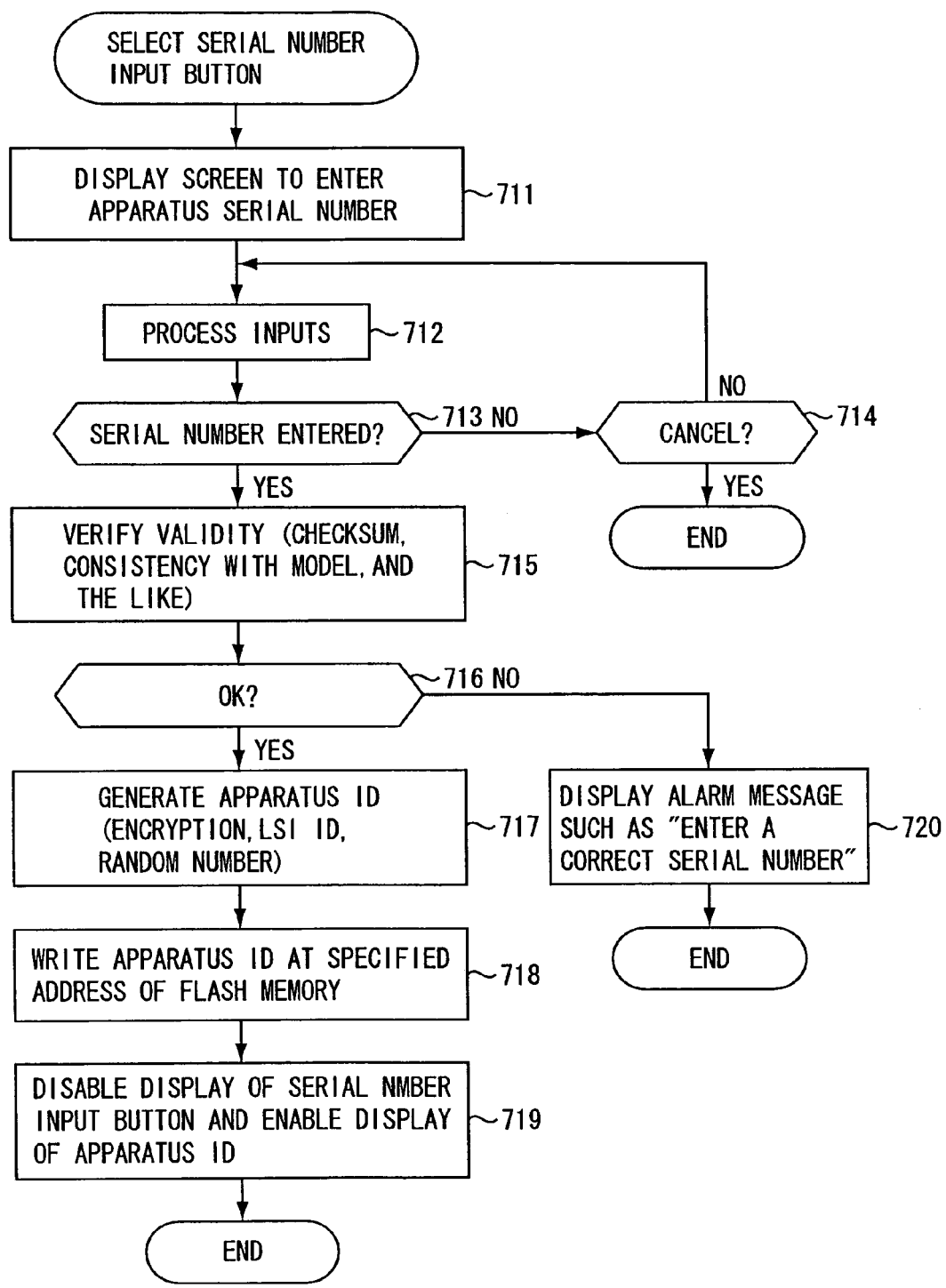

FIG. 7(b) shows a process when the serial number input button is selected on the screen in FIG. 5(b) displayed at step 703. At step 711, the process displays a screen for entering the apparatus serial number. FIG. 5(c) shows a screen displayed at step 711 on the display unit 115 of the mixer 101. The screen displays the OK button and the cancel button along with an input area for entering the apparatus serial number.

At steps 712 through 714, a user enters the apparatus serial number and selects the OK button. The apparatus serial number is described on a nameplate and the like attached to the apparatus. The process then verifies validity of the entered apparatus serial number at step 715. This process confirms whether a checksum is calculated for the apparatus serial number or whether the apparatus serial number is included in a range corresponding to the apparatus model. If the apparatus serial number is verified to be valid, the process proceeds to step 717 from step 716 and generates an apparatus ID from the entered apparatus serial number. This process supplies the apparatus serial number with specific information such as a Large Scale Integrated Circuit Identification Number (LSI ID) of this apparatus and a random number, and encrypts the information to generate an apparatus ID. The apparatus ID contains the above-mentioned specific information. The apparatus serial number corresponds to the apparatus ID generated from the apparatus serial number. The process is configured to be capable of checking the correspondence and confirming validity of the apparatus serial number and the apparatus ID. Of course, its method is not open to the user. At step 718, the process writes the entered apparatus serial number and the generated apparatus ID to the specified addresses (areas 302 and 303 in FIG. 3(*a*)) of the flash memory 112. At step 719, the process disables the display of the serial number input button, enables the display of the apparatus ID, and then terminates.

After the apparatus ID is determined, the PC 102 connects to the management site 104 via the Internet 103. The PC 102 transmits the apparatus serial number, the apparatus ID, and a mail address to the management site 104. The user is requested to enter the mail address. These pieces of information are registered to a management database of the management site 104. This completes the user registration of the mixer 101. The user registration may use not only the Internet 103, but also the other means such as postal delivery and fax.

Selecting the cancel button on the screen in FIG. 5(*c*) terminates the process from step 714. If the validity is not confirmed at step 715, the process proceeds to step 720 from step 716. The process displays an alarm message such as "Enter a correct serial number", and then terminates.

Figure 8A:
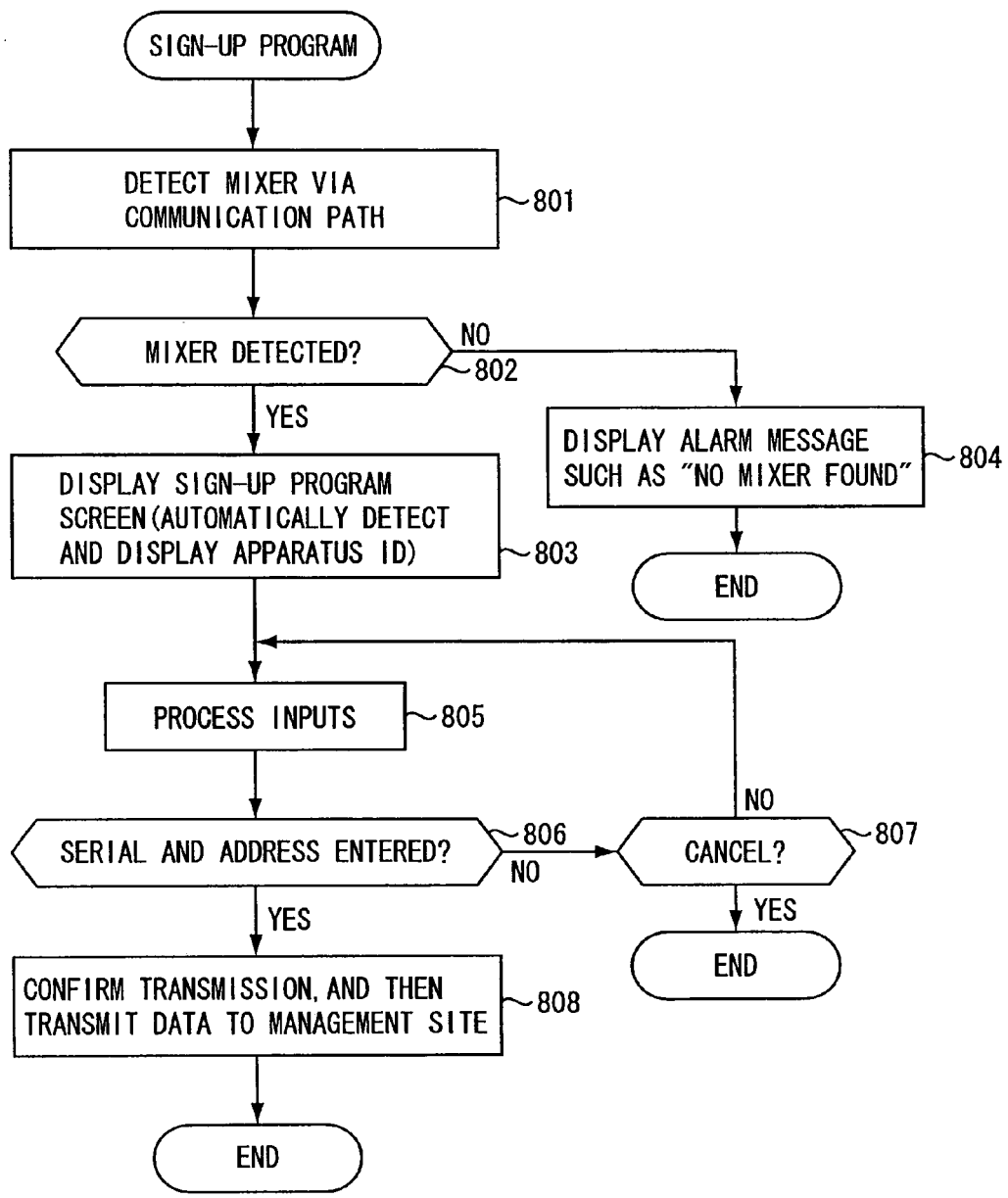
FIGS. 8(a) and 8(b) show flowcharts of a sign-up process for additional effects and a process at the management site.

FIG. 8(*a*) shows a sign-up process for a user who purchased the package (license) of additional effects. The sign-up program runs on the PC 102. More specifically, the user can start the sign-up program by selecting it from a menu of the program that is installed in the PC 102 and controls the mixer 101.

At step 801, the process checks whether or not the mixer 101 is connected to the PC 102 via the communication path 121. If the mixer 101 is connected, the process proceeds to step 803 from step 802 and displays a sign-up program screen on the display of the PC 102. FIG. 6(*a*) shows a sign-up program screen. The screen contains fields for the model, the apparatus serial number, and the apparatus ID. These fields display data read from the management data in FIG. 3(*a*) via the communication path 121. Fields for the serial and the mail address are empty. Here, it is assumed that the user obtains the data serial number by purchasing the package of additional effects. At steps 805 through 807, the user enters the data serial number and his or her mail address, and then selects the Send button. The process proceeds to step 808. The process confirms whether or not the user is sure to transmit the data, and then transmits the data to the management site 104 via the Internet 103. The transmission data comprises the management data (model, apparatus serial number, and apparatus ID) displayed in FIG. 6(*a*) as well as the data serial number and the mail address the user entered.

If the mixer 101 is not connected, the process displays an alarm at step 804, and then terminates. When the cancel button is selected during input of the data serial number and the mail address, the process terminates after step 807.

FIG. 8(*b*) shows a process at the management site that receives the information transmitted at step 808. At step 821, the process checks validity of the model, the apparatus serial number, and the apparatus ID that have been transmitted. More specifically, the process checks if the model data is correct or if the apparatus serial number corresponds to the apparatus ID. If the validity is confirmed, the process proceeds to step 823 from step 822 and confirms the user. More specifically, the process checks whether or not the user's apparatus serial number is already registered to the management database. When the user's apparatus serial number is registered to the management database, the process checks whether or not the transmitted mail address matches the registered one. When the user is authenticated, the process checks the transmitted data serial number at step 826. More specifically, the process confirms whether or not the checksum is valid, the data serial number conforms to the apparatus model, the same data serial number is registered to the management database, and the like. If the data serial number is valid, the process registers the transmitted data serial number to a field for the corresponding user in the management database at step 829. Further, at step 830, the process generates an access key based on the user's apparatus ID and the data serial number, and then registers the access key to a field for the corresponding user in the management database. At step 831, the process generates mail including the access key and transmits the mail to the user. As described with reference to the management data in FIG. 3(*a*), the access key provides key information to enable the use of additional effects corresponding to the access key.

If the validity check fails at steps 821 and 823, the process proceeds to step 825 from steps 822 and 824. A responsible person creates mail and sends it to the user for inquiry. If the data serial number is found to be incorrect at step 826, the process proceeds to step 828 from step 827 and sends mail to the user to notify that the serial number is incorrect.

FIG. 9 shows a process performed when the user receives mail (transmitted at step 831) including the access key and enters this access key to the mixer 101. The program also runs on the PC 102. The user can start the program by selecting it from a menu of the program that controls the mixer 101.

At step 901, the process obtains the apparatus ID and the data serial number. The apparatus ID is obtained from the mixer 101 via the communication path 121. The data serial number is read and obtained from a storage device of the PC 102. The data serial number is entered by the user from the screen in FIG. 6(*a*) at step 805 and is stored in the storage device of the PC 102. If the apparatus ID and the data serial number cannot be obtained, the process proceeds to step 903 from step 902, displays an alarm message, and then terminates. If the apparatus ID and the data serial number are obtained, the process proceeds to step 904 and displays a key input screen. FIG. 6(*b*) displays the key input screen. The screen displays the model, the apparatus serial number, and the apparatus ID, i.e., the data read from the mixer 101 via the communication path 121. The displayed data serial number corresponds to the data obtained at step 901. A key input field is empty for the user to enter the access key received by the mail.

At steps 905 and 906, the user enters the access key and selects the OK button. At step 907, the process checks the entered access key based on the apparatus ID and the data serial number. More specifically, the process finds an access key in the same manner as generating the access key at step 830 on the management site 104, and then checks if the access key matches the entered access key. If the check succeeds, the process proceeds to step 909 from step 908. The process writes the data serial number and the access key to the corresponding fields (305 and 306) in the management data for the mixer 101 via the communication path 121. The process prepares information indicating the access key is effective, writes the information in the miscellaneous data 307, and then terminates. If the access key check fails, the process proceeds to step 910, displays an alarm, and then terminates.

FIG. 10 shows a structure of the management database that is provided for the management site 104 and is used for user registration and license management of additional effects for each user. A normal serial 1001 is a field to store a normal apparatus serial number. An input serial 1002 is a field to store the user-entered apparatus serial number. An apparatus ID 1003 is a field to store the user's apparatus ID. An E-mail AD 1004 is a field to store the user's mail address. As shown in FIG. 7, the mixer 101 generates and stores the apparatus ID. Thereafter, the user's apparatus serial number, apparatus ID, and mail address are transmitted to the management site 104 via the Internet or the postal delivery. The management site 104 stores these pieces of data in such fields as the input serial 1002, the apparatus ID 1003, and the E-mail AD 1004 for user registration. The corresponding normal serial 1001 remains empty.

Here, let us assume that the user enters an incorrect apparatus serial number on the screen in FIG. 5(c). An apparatus ID may be generated from the incorrect apparatus serial number. These pieces of data may be transmitted to the management site 104. In such case, the management site 104 checks whether or not the apparatus serial number is already registered to the management database. If not registered, the management site 104 registers the apparatus serial number. Consequently, the incorrect apparatus serial number and the like are registered. Since the apparatus serial number corresponds to the apparatus ID, no problem occurs during the consistency check. However, another user may register the same apparatus serial number later. In this case, the management site 104 detects that the apparatus serial number is already registered to the management database, and then performs an exceptional process. An example of the exceptional process is notification to an operator at the management site 104. As an exceptional process, an inquiry is issued to the user by means of electronic mail, for example. The user is requested to fax a copy of the nameplate or the certificate where the apparatus serial number is described. When it is confirmed that the user has the normal apparatus serial number, the previously registered user is assumed to have entered an incorrect apparatus serial number. In this case, this user is requested to inform the correct apparatus serial number that is then stored as the user's normal serial 1001. The management site 104 stores the normal apparatus serial number and the apparatus ID supplied by the subsequent user in the input serial 1002 and the apparatus ID 1003 for the user. Though a plurality of users have the same input serial 1002, the apparatus ID is generated including the specific information such as the apparatus's LSI ID and the random number. Even if the same apparatus serial number is registered for a plurality of users, it is ensured to generate different apparatus IDs. Accordingly, users can be distinguished from each other as long as the apparatus IDs are used for identification. If the input serial 1002 contains the incorrect apparatus serial number entered by the user, the normal serial 1001 stores the normal apparatus serial number. It may be preferable to use data in the input serial 1002 and the apparatus ID 1003 during an ordinary check process. When the normal apparatus serial number is required, it just needs to use data in the normal serial 1001. In the above-mentioned case, the previously registered user enters an incorrect apparatus serial number. The same applies to a case where the previous user specifies the correct apparatus serial number and the subsequent user specifies an incorrect one.

This system is adopted for the following reason. An apparatus ID is generated from the apparatus serial number the user entered from the screen in FIG. 5(c). The generated apparatus ID is written to the management data for the mixer 101. Once written to the management data, the apparatus ID cannot be rewritten easily even if it is generated from an incorrect apparatus serial number.

An EFA information field 1005 stores license information about a package of additional effect 312 (A1 through A6) in FIG. 3(b). An EFB information field 1006 stores license information about the additional effect 313 (B1 through B6). Each field is represented as having one column in the drawing. Actually, however, the fields each have columns for storing the normal data serial, the input data serial, and the access key. When an access key is obtained for the data serial of the additional effect 312, for example, the process stores the data serial and the access key thus obtained in the columns for storing the input data serial and the access key in the EFA information 1005 (step 909).

Figure 8B:
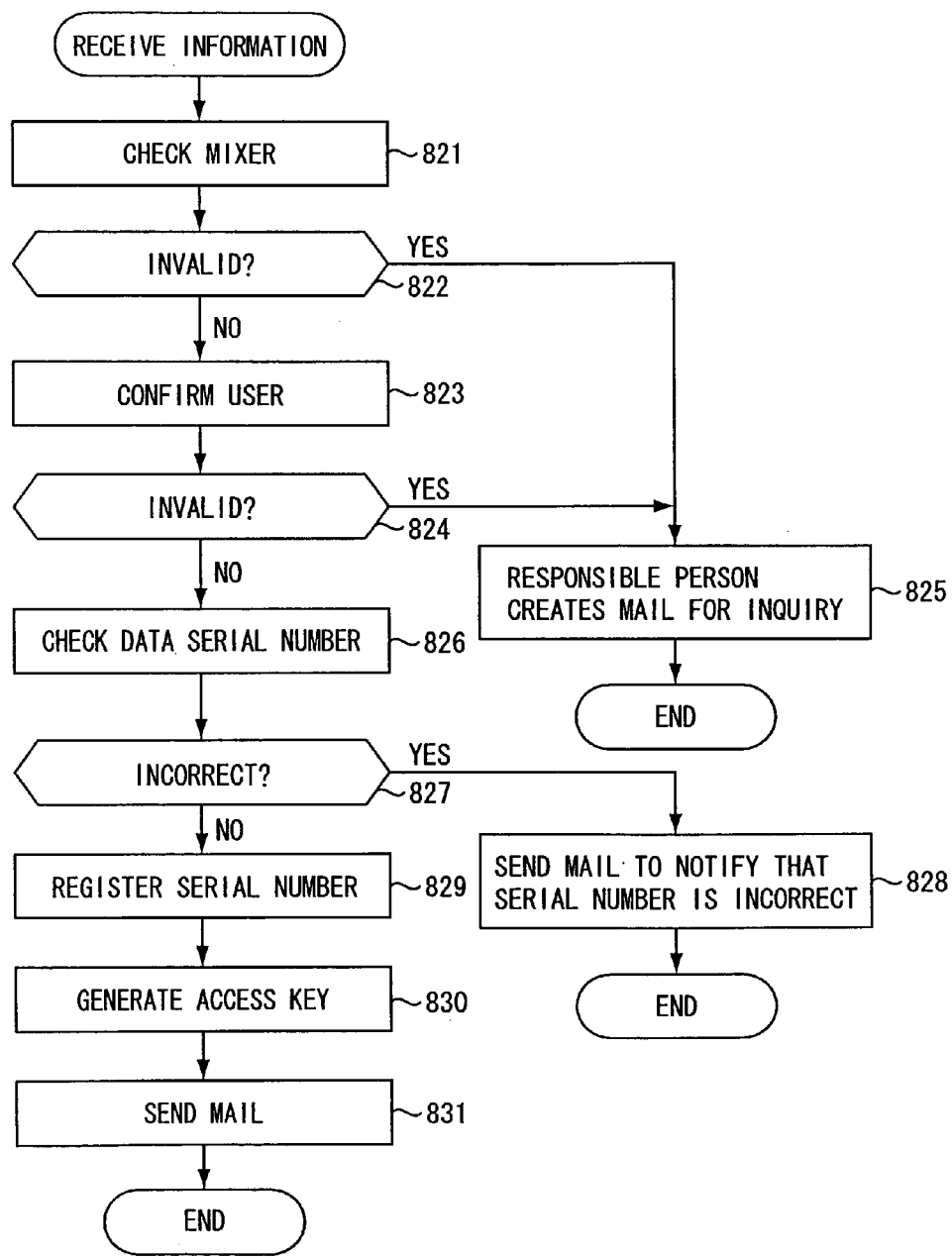

If the user enters an incorrect data serial, a checksum error mostly occurs at step 826 in FIG. 8(b). At step 828, the user is notified that the data serial is incorrect. The user is then requested to retry the sign-up procedure using the correct data serial. Even if an incorrect data serial is entered, no checksum error may occur accidentally. Alternatively, the data serial may simply comprise sequence numbers without the checksum. In these cases, when the same data serial is already registered in the management database, the process still detects at step 828 that the same data serial is already registered. Consequently, a data serial error is reported to the user by means of electronic mail. When the same data serial is detected during the registration, it is considered that the previous or subsequent registered user inadvertently or intentionally entered an incorrect data serial. In the same manner as the case of the apparatus serial number, the user is requested to fax a copy of the certificate where the data serial is described, for example. This makes it possible to identify a user who entered the incorrect data serial. In addition, the normal data serial can be obtained. When the management database already registers the incorrectly entered data serial and the access key generated therefrom, the obtained normal data serial just needs to be stored in the column for the normal data serial. The user's data serial and access key need not be changed. Even if the user cannot prove the correct data serial, it is possible to identify the apparatus serial number or the apparatus ID of the user. Various countermeasures are available.

It is convenient for the check process to embed the model information in the apparatus ID. Only the apparatus ID can be used to identify the model. While the above-mentioned example manages availability or unavailability in units of packages, individual additional effects may be managed. While a responsible person uses electronic mail to notify the user of an alarm message or an access key, it may be preferable to use a telephone or a fax for communication.

While the embodiment has described the example of managing availability or unavailability of additional effects, the embodiment is also applicable to the other music data. For example, the embodiment can be applied to timbre data, sound source algorithm, song data, rhythm data, accompaniment data, and the like. The additional effect according to the embodiment may comprise only parameters or an algorithm and parameters.

The above-mentioned embodiment has explained the apparatus's LSI ID and the random number as examples of the specific information to be used to generate an apparatus ID from the apparatus serial number. Further, the other information may be used if it is actually ensured that different apparatus IDs are generated from the same apparatus serial number. For example, it may be preferable to use the date and time information when the apparatus ID is generated. According to the embodiment, the access key is generated from the data serial and the apparatus ID. Moreover, the apparatus serial number may be used instead of the apparatus ID. The data type may be used in addition.

The embodiment has described the example of applying the present invention concerning the effect data recorded in the built-in nonvolatile memory before shipment. Further, the present invention may be applied concerning any music data later added to the nonvolatile memory.

What is claimed is:

1. A method of managing a license of music data which is stored in a musical apparatus before shipment thereof or when firmware of the musical apparatus is upgraded and which can be used by the music apparatus, comprising the steps of:

allowing use of the stored music data when the musical apparatus possesses an access key corresponding to the music data in a specified area of a nonvolatile memory;

limiting use of the stored music data when the musical apparatus does not possess the access key corresponding to the music data in the specified area of the nonvolatile memory;

entering a serial number of the music data, wherein the serial number is obtained by acquiring a license of the music data;

transmitting the serial number of the music data along with identification information of the musical apparatus to a management site of the music data via a network;

checking a database of the management site to confirm a validity of the transmitted serial number and the identification information, thereby issuing an access key corresponding to the serial number and the identification information; and memorizing the serial number and the issued access key in the specified area of the nonvolatile memory so that the musical apparatus is allowed to use the stored music data.

2. The method according to claim 1, wherein the managing site generates the access key by performing a predefined mathematical operation using the transmitted serial number and the identification information, and wherein the musical apparatus retrieves the identification information which is previously stored in the music apparatus, performs the predefined mathematical operation using the retrieved identification information and the serial number stored in the specified area of the nonvolatile memory to generate an access key, and permits the use of the stored music data only when the generated access key matches the issued access key stored in the specified area of the nonvolatile memory.

3. The method according to claim 1, wherein the stored music data is collection of various items of effect data which can be used by the music apparatus to impart various effects to music sounds, and each item of the effect data can be made useable by obtaining the access key corresponding to each item.

4. The method according to claim 1 wherein the stored music data includes at least one of timbre data, sound source algorithm, song data, rhythm data, and accompaniment data, and wherein each of these data can be made useable by obtaining the access key corresponding to each of these data.

5. A computer-readable storage medium storing program executable in a music apparatus for managing a license of music data which is stored in the musical apparatus before shipment thereof or when firmware of the music apparatus is upgraded and which can be used by the music apparatus, the program comprising the steps of:

allowing use of the stored music data when the musical apparatus possesses an access key corresponding to the music data in a specified area of a nonvolatile memory:

limiting use of the stored music data when the musical apparatus does not possess the access key corresponding to the music data in the specified area of the nonvolatile memory;

entering a serial number,of the music data, wherein the serial number is obtained by acquiring a license of the music data;

transmitting the serial number of the music data along with identification information of the musical apparatus to a management site of the music data via a network;

receiving an access key from the management site where a database thereof is checked to confirm a validity of the transmitted serial number and the identification information, thereby issuing the access key corresponding to the serial number and the identification information; and memorizing the serial number and the received access key in the specified area of the nonvolatile memory so that the musical apparatus is allowed to use the stored music data.

6. A music apparatus configured for self-managing a license of music data which is stored in the musical apparatus before shipment thereof or when firmware of the music apparatus is upgraded and which can be used in the music apparatus, the music apparatus comprising:

an allowing part that allows use of the stored music data when the musical apparatus possesses an access key corresponding to the music data in a specified area of a nonvolatile memory;

a limiting part that limits use of the stored music data when the access key corresponding to the music data is not registered in the specified area of the nonvolatile memory integrated in the music apparatus;

an input interface configured to allow a user to enter a serial number of the music data, wherein the serial number is obtained by acquiring a license of the music data;

a transmitting part that transmits the serial number of the music data along with identification information of the musical apparatus to a management site of the music data via a network;

a receiving part that receives an access key from the management site where a data thereof is checked to confirm a validity of the transmitted serial number and the identification information, thereby issuing the access key corresponding to the serial number and the identification information; and a writing part that writes the serial number and the received access key in the specified area of the nonvolatile memory so that the musical apparatus is allowed to use the stored music data.

* * * * *